United States Patent [19]
Overman

[11] Patent Number: 5,993,667
[45] Date of Patent: Nov. 30, 1999

[54] PROCESS FOR REMOVING SELENIUM FROM REFINERY PROCESS WATER AND WASTE WATER STREAMS

[75] Inventor: Steven D. Overman, Bakersfield, Calif.

[73] Assignee: Texaco Inc., White Plains, N.Y.

[21] Appl. No.: 08/954,405

[22] Filed: Oct. 20, 1997

[51] Int. Cl.[6] .................................................. C02F 1/58
[52] U.S. Cl. ..................... 210/709; 210/721; 210/724; 210/726; 210/737; 210/911
[58] Field of Search ................... 210/709, 721, 210/724, 726, 727, 737, 738, 787, 902, 911, 912

[56] References Cited

U.S. PATENT DOCUMENTS

| | | | |
|---|---|---|---|
| 3,933,635 | 1/1976 | Marchant | 210/50 |
| 3,954,603 | 5/1976 | Curtin | 208/253 |
| 4,405,464 | 9/1983 | Baldwin et al. | 210/717 |
| 4,519,913 | 5/1985 | Baldwin et al. | 210/611 |
| 4,678,584 | 7/1987 | Elfline | 210/719 |
| 4,687,559 | 8/1987 | Coburn et al. | 204/110 |
| 4,792,405 | 12/1988 | Baker | 210/721 |
| 4,806,264 | 2/1989 | Murphy | 210/695 |
| 4,853,110 | 8/1989 | Singhal et al. | 208/253 |
| 4,915,928 | 4/1990 | Marcantonio | 423/510 |
| 4,940,549 | 7/1990 | Olsen et al. | 210/695 |
| 4,943,377 | 7/1990 | Legare, III | 210/709 |
| 5,071,568 | 12/1991 | Bennett et al. | 210/754 |
| 5,164,095 | 11/1992 | Sparapany et al. | 210/735 |
| 5,200,082 | 4/1993 | Olsen et al. | 210/667 |
| 5,250,185 | 10/1993 | Tao et al. | 210/654 |
| 5,264,133 | 11/1993 | Forschner et al. | 210/670 |
| 5,322,600 | 6/1994 | Spitz et al. | 204/151 |
| 5,376,262 | 12/1994 | Perry | 210/651 |
| 5,401,420 | 3/1995 | Siefert | 210/709 |
| 5,492,620 | 2/1996 | Evans | 210/96.1 |
| 5,510,040 | 4/1996 | Miller et al. | 210/721 |
| 5,575,919 | 11/1996 | Santina | 210/724 |

FOREIGN PATENT DOCUMENTS

WO95/21136  8/1995  WIPO .

OTHER PUBLICATIONS

"Adsorption of selenuim by amorphus iron oxyhydroxide and manganese dioxide," by Laurie S. Balistrier, et al., *Geochimica et Cosmochimica Acta*, vol. 54, pp. 739–751.

"Selenium Adsorption by Goethite," by Laurie S. Balistrieri, et al., *Soil Science Society of America Journal*, vol. 51, No. 5, Sep.–Oct. 1987.

(List continued on next page.)

*Primary Examiner*—Peter A. Hruskoci
*Attorney, Agent, or Firm*—Henry H. Gibson; Arnold, White & Durkee

[57] ABSTRACT

The present invention provides an efficient and highly effective method of removing dissolved selenium from a variety of refinery process water and wastewater streams. The present invention also provides a new and effective method of oxidizing selenium and organo-selenium compounds to the selenite [+IV] oxidation state in order to be adsorbed by a metal oxide or metal hydroxide precipitate. The invention includes two continuous stirred-tank reactors (CSTR) operated in series. The stream to be treated and one of several iron salts (ferric sulfate, ferric chloride, etc.) are introduced into the first CSTR, forming ferric hydroxide and ferric oxyhydroxide precipitates. The pH of the first CSTR is automatically controlled by adjusting the injection rate of the ferric salt. The effluent stream from the first CSTR is directed into a second CSTR into which potassium permanganate is introduced. The selenium in the original stream to be treated is oxidized to selenite [+IV]; manganese dioxide precipitates as a byproduct of the oxidation reactions. The selenite is then adsorbed by the various precipitates, which are removed by centrifugation. The pH of the centrifuged water is automatically adjusted by the controlled addition of sodium hydroxide. The effectiveness of this continuous process has been demonstrated for streams with a wide range of selenium concentrations, including refinery wastewater and refinery stripped sour water. The process is also effective for treating secondary waste water streams, such as reverse osmosis reject water and ion exchange regeneration wastewater, which result from the pretreatment of refinery wastewater or refinery stripped sour water.

8 Claims, 2 Drawing Sheets

OTHER PUBLICATIONS

"Optimization of Ferric Hydroxide Coprecipitation Process for Selenium Removal from Petroleum Refinery Stripped Sour Water," by Matthew B. Gerhardt, et al.

"Dirty Crude," (The first oil industry–wide analysis of selenium discharge trends impacting San Francisco Bay) by Citizens for a Better Environment (CBE), Report No. 94–1, Mar. 1994.

Texaco Memorandum from Dr. R. B. Borey to D. R. Hall, "RES–02–03, Selenium Removal From BkP Wastewater" (Report on Bench Scale Study), dated Jul. 10, 1992.

"Removal of Selenium from Refinery Discharges," by Joel Harmon, Shell Martinez, et al., *Western States Petroleum Association*, dated May 1992.

Memorandum of Western States Petroleum Association from Scott Folwarkow, et al. to Bay Area Refining Committee, re "Approval of Selenium Cease and Desist Order and WSPA Settlement," dated Jan. 19, 1994.

WSPA Selenium Technology Study (Charts).

"Selenium Speciation," Final Report of Western States Petroleum Association, *Brown and Caldwell*, Jul. 1994.

"Removal of Selenium by Iron–Based Treatment Processes," Final Report of Western States Petroleum Association, *Brown and CaldwellI*, May 1995.

"Selenium Removal Technology Study," Project Final Report of Western States Petroleum Association, *Montgomery Watson*, Jul. 1995.

"Removal of Metals From Wastewater" (Neutralization and Precipitation), Chapters 3, 4, 6 and 7. Prepared by A. S. Goldfarb, et al., copyright 1984.

American Water Works Association, *Water Quality and Treatment*, 4th Ed., McGraw Hill, 1990, Chapters 1, 2, 3, 10 & 12.

Electric Power Research Insitiute, Trace Element Removal by Iron Adsoption/Coprecipistation: Proces Design Manual, No. GS–7005, 1990, pp.: Table of Contents, 1–1 to 1–7, 2–1 to 2–32, 3–1 to 3–12, 4–1 to 4–12, A–1 to A10, and B–1 to B14.

PROCESS FOR REMOVING SELENIUM FROM REFINERY PROCESS WATER AND WASTE WATER STREAMS

BACKGROUND OF THE INVENTION

1. Field of the Invention

The present invention relates to a continuous process for reducing the concentration of water soluble inorganic and organic selenium species in aqueous solutions. More particularly, the process relates to the removal of selenium from a variety of refinery process water and wastewater streams such as stripped sour water, phenolic stripped sour water, reverse osmosis reject water from the pretreatment of refinery wastewater or stripped sour water, and ion exchange regeneration wastewater from the pretreatment of refinery wastewater or stripped sour water. The invention provides for the recovery of selenium from these aqueous process or wastewater streams to allow refineries to meet increasingly stringent regulatory requirements for the concentration and mass emission rates of selenium in discharged refinery wastewater.

2. Background

Selenium compounds are present in trace quantities in petroleum as high molecular weight, organometallic molecules. The concentration of selenium in petroleum varies by production location and ranges from non-detect to over 1.0 part per million (ppm) by weight. The organic selenium compounds in the petroleum are distilled into the heavier hydrocarbon fractions during refining. The selenium is liberated from the heavy hydrocarbons by catalytic or thermal cracking processes, such as hydrocrackers and delayed cokers, removed as inorganic compounds and concentrated in the overhead product and vapor streams. These inorganic selenium compounds, like similar inorganic sulfur and nitrogen compounds such as hydrogen sulfide and ammonia, are very soluble in water and are generally removed from the overhead streams by contacting them with water. The sulfur and nitrogen species are typically volatile and can be removed from the "sour water" stream by stripping (contacting the water stream with a countercurrent stream of steam); but the selenium species are somewhat less volatile, and most of the selenium remains in the sour water even after stripping. Because high concentrations of selenium are toxic, it may be necessary for some refineries to reduce the concentration of selenium in the stripped sour water and other waste waters before they can be discharged to the environment.

There are a number of known methods of removing selenium from aqueous and hydrocarbon streams. These fall broadly into three categories: methods in which the selenium compounds are altered by chemical reaction, methods that rely on adsorption and methods that rely on membrane separation. Several of the reaction methods involve treatment with hydrogen or other reducing agents to convert the dissolved selenium species to elemental selenium. Other methods employ bacteria which accomplish the same reaction metabolically. Still other reaction methods, directed specifically toward the removal of hydrogen selenide, involve oxidation of the selenide to elemental selenium. A number of additional reaction methods are based on the reaction of selenium with various sulfur-containing compounds to form insoluble sulfides. Still other methods are known which employ electrolysis or anion exchange to extract selenium-containing ions or to replace them with less toxic anions.

A number of methods are also known for removing selenium from waste water by adsorbing the selenium compounds on a solid adsorbent. Some of the materials that have been employed as adsorbents include zeolites, dithiocarbamates and their polymers, and metal salts such as ferric chloride and ferric sulfate. Most of these adsorption methods are effective where the selenium is in the form of selenite anions, but not effective in removing the selenocyanate ion, $SeCN^-$, which is the predominant form of selenium in refinery waste water and stripped sour water. Attempts have been made to oxidize the selenocyanate prior to introducing the adsorbent; oxidizing agents which have been employed have included air, ozone, hydrogen peroxide, and chlorine dioxide. None of these oxidants has proven entirely satisfactory: air is ineffective for oxidizing selenocyanate, while ozone and peroxide require highly alkaline conditions for maximum effectiveness. Chlorine dioxide oxidizes selenocyanate effectively at neutral pH, but it is unstable in aqueous solution and would have to be generated as needed.

U.S. Pat. No. 5,200,082 discloses a selenium removal method in which the selenium compounds in the water are first reduced to elemental selenium, then re-oxidized to selenite and removed by a conventional adsorption method as described above. Because the process requires the reintroduction of sulfur into the water, it is unsuitable for water streams such as stripped sour water which have previously undergone sulfur removal.

SUMMARY OF THE INVENTION

The object of the present invention is to remove selenium from refinery water streams by oxidizing the selenocyanate ions in the water to selenite ions, which may then be adsorbed on ferric hydroxide or similar insoluble materials suspended in the water. The oxidation is carried out in a continuously stirred tank reactor by adding an aqueous potassium permanganate solution to the water stream. A further aspect of the invention is that the resulting selenite ions are adsorbed not only on the iron precipitates but also on the manganese dioxide that is produced as a by-product of the oxidation.

To carry out the selenium removal process, the selenium-containing water is first cooled to approximately 80 to 90 degrees Fahrenheit and fed to a continuously stirred tank reactor. There the water is mixed with an aqueous solution of ferric sulfate or other soluble ferric salt to reduce the pH of the water and to produce a precipitate consisting of ferric hydroxide and ferric oxyhydroxide. The reactor effluent is directed to a second continuously stirred tank reactor, where it is mixed with an aqueous permanganate solution, causing the oxidation of the selenium to selenite and forming a manganese dioxide precipitate. The selenite is adsorbed on both the manganese dioxide and the ferric hydroxide, and is removed with them by centrifugation. Finally, the treated water is mixed with an aqueous base solution to increase the pH of the water to a range suitable for further use or discharge.

DETAILED DESCRIPTION OF THE INVENTION

The water stream to be treated may consist of refinery process water, refinery wastewater, reverse osmosis reject water, ion exchange regeneration wastewater, or any other industrial or agricultural water stream with an elevated selenium concentration. One example of a refinery process water stream suitable for treatment by the present process is phenolic stripped sour water, which typically originates as sour water from delayed cokers and is produced by a sour water stripper as described above and which may have a selenium concentration of 5.0 mg/l and a temperature of 150 degrees Fahrenheit. Other water streams suitable for treatment by the process described herein may or may not require a heat exchanger to reach the target temperature range of 80 to 90 degrees Fahrenheit.

The preferred ferric salts are ferric chloride and ferric sulfate, most preferably ferric sulfate. It will be apparent to one skilled in the art, however, that other water soluble iron (III) compounds may be substituted in the process.

The addition of the ferric salt solution to the water stream is preferably carried out at ambient or subambient temperatures. For this reason a further aspect of the invention is the provision of cooling means, such as a continuous-flow heat exchanger, for the water stream to be treated, upstream of the point at which it comes into contact with the ferric salt solution.

Because the present invention is most effective when the process is maintained within the narrow pH range of 4.0 to 4.2, a further aspect of the invention is that the automatic addition of ferric salt to the water precedes the oxidation step. The process thus provides intrinsic means for adjusting the pH of the water stream and eliminates any need to introduce additional reagents to control the pH prior to the oxidation or precipitation steps. Similarly, the invention includes automatic means for increasing the pH of the water to between 6 and 8 pH units following the oxidation step so that the treated water may be safely discharged or used for other purposes within the refinery.

The preferred permanganate compound for the oxidation step is potassium permanganate. Other strong oxidizing agents, such as potassium dichromate or chlorine dioxide, are less useful in the practice of the present invention because they do not form a precipitate to assist in the removal of selenium compounds. That is to say, oxidation with permanganate generates as its by-product a manganese dioxide precipitate, which functions as an additional adsorbent capable of removing selenite ions.

Description of Illustrative Embodiments

Figure 1:
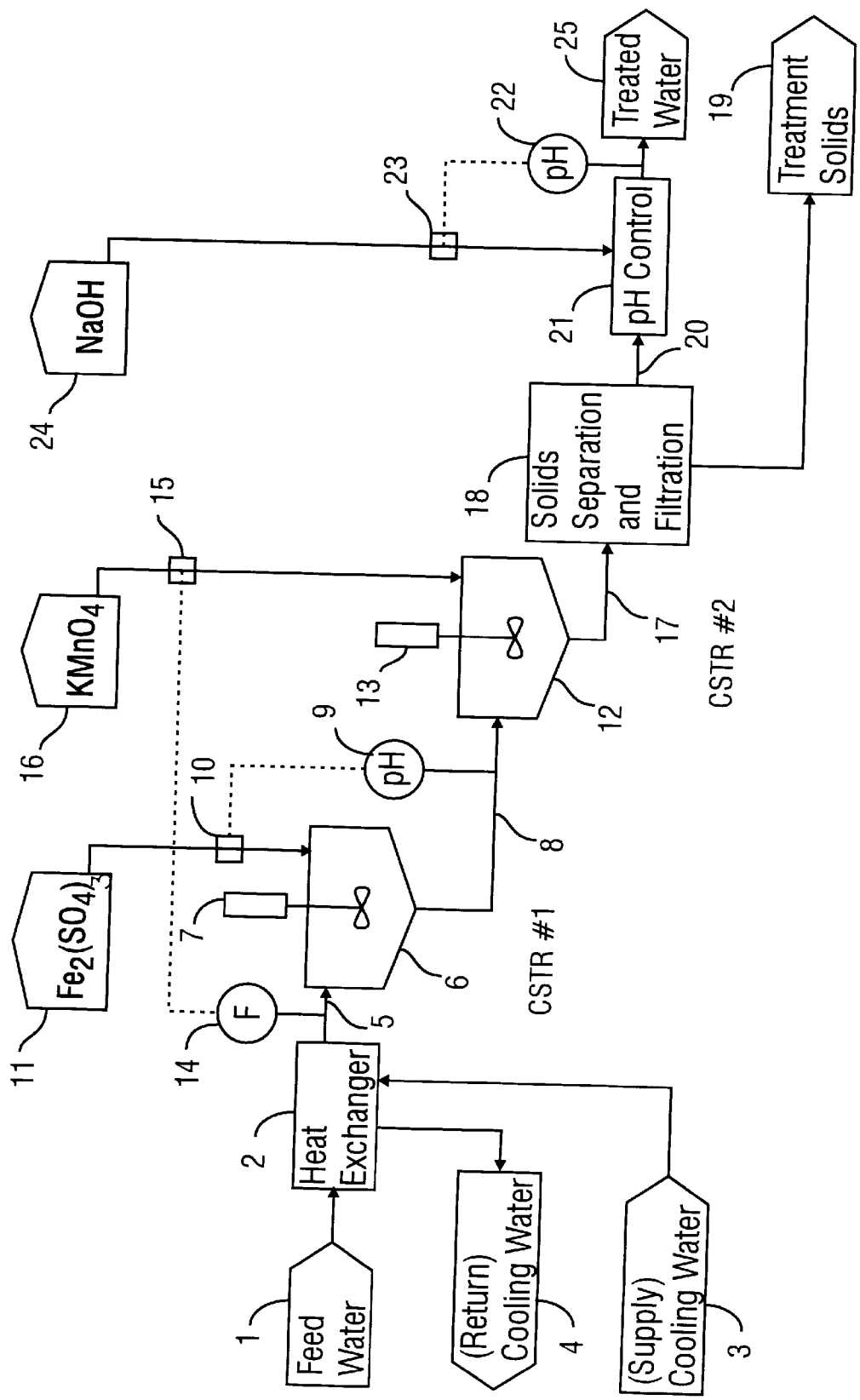
FIG. 1 is a schematic process flow diagram for the overall selenium removal process. This diagram describes the fundamental operation of the invention and an example of the chemical additives necessary for the removal of selenium and selenium compounds from refinery and other industrial wastewaters.

FIG. 1 presents one embodiment of the present invention. A water stream containing selenium (1) is directed to a heat exchanger (2) to cool the water stream, if necessary, to a temperature of 80 to 90 degrees Fahrenheit. A cooling water supply stream (3) is directed to the heat exchanger to reduce the feed temperature and produce a cooling water return stream (4). The feed water stream (5) from the heat exchanger is directed to the first continuous stirred-tank reactor (CSTR) (6) for treatment. The contents of the first CSTR are continuously mixed by a mixer (7). The pH of the effluent of the first CSTR (8) is adjusted to a range of 4.0 to 4.2 pH units by a pH controller (9) that regulates the addition of ferric sulfate, 36% by weight solution, by a chemical feed pump (10). The chemical feed pump draws ferric sulfate from a bulk storage tank (11) and directs it to the first CSTR (6). The effluent from the first CSTR (8) is directed to a second CSTR (12) placed in series with the first CSTR. As with the first CSTR, the contents of the second CSTR are continuously mixed by a mixer (13). The addition rate of potassium permanganate, 5% solution by weight, is adjusted by a ratio flow controller (14) to maintain a fixed ratio to the flowrate of the influent feed stream (5) of the first CSTR. The flow controller controls a chemical injection pump (15) that directs potassium permanganate from a bulk storage tank (16) to the second CSTR (12). The effluent (17) from the second CSTR is directed to a solids separation and filtration system (18) capable of separating and recovering all solids down to a particle size of one micron. The solids separation and filtration system (18) may consist of any single device or combination of devices necessary to achieve this level of solids separation and filtration. Such equipment may include flocculators, clarifiers, centrifuges, multi-media or cartridge filters, filter presses, or any other comparable separation device or combination of devices. The specific configuration would depend on economic and other process design considerations, but the system must remove all solids with a particle size of one micron or larger. The treatment solids (19) produced by the separation and filtration system should have no free liquids and should ideally be less than 50% by weight water for more efficient handling, disposal, or reclamation. The filtered water stream (20) should be clear and free of any solid particles. At this point, the filtered water still exhibits the same pH as the effluent (17) of the second CSTR and the pH must be adjusted (raised) to a range of 6.0 to 8.0 pH units. In order to accomplish this, the effluent (20) from the solids separation and filtration system is directed to a pH adjustment system (21). This system may consist of any combination of continuous flow equipment necessary to adjust and control the pH. Typically this equipment would include a pH controller (22) that regulates a chemical feed pump (23) that draws sodium hydroxide solution, from a bulk storage tank (24) to the pH control system (21). The final treated water (25), with a selenium concentration less than 0.5 mg/l (or lower if necessary) and a pH between 6.0 and 8.0 is then directed to a water reuse application or a disposal location.

Figure 2:
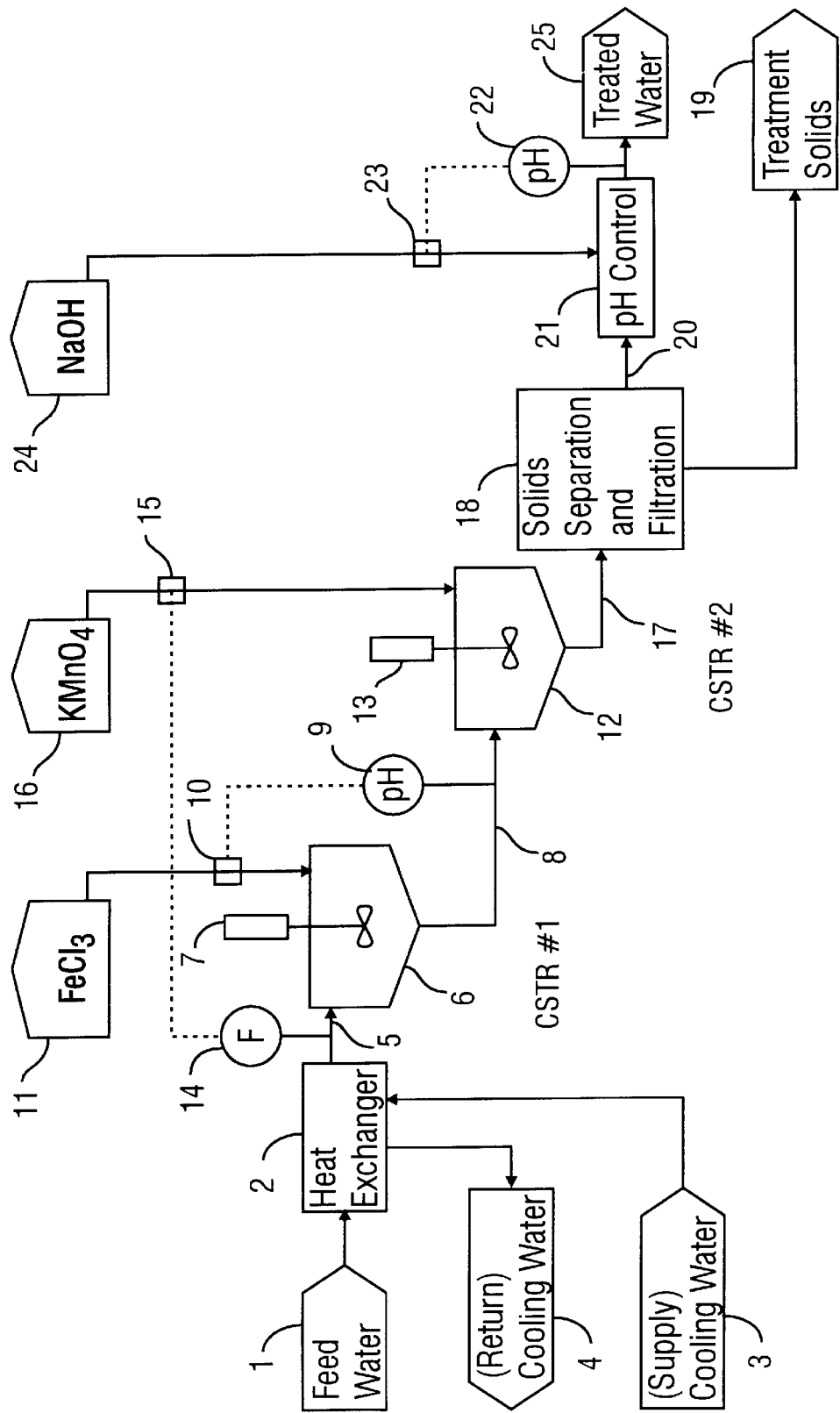
FIG. 2 is a schematic process flow diagram for the overall selenium removal process similar to FIG. 1, but illustrates the use of the process with ferric chloride rather than ferric sulfate.

FIG. 2 presents a second embodiment of the present invention in which ferric chloride is substituted for ferric sulfate in the bulk chemical storage tank (11). Ferric chloride provides the same level of treatment by the same chemical reactions and mechanisms as ferric sulfate. In general, ferric chloride is cheaper than ferric sulfate; but if ferric chloride is used the remaining chloride ions in the final treated water steam (25) may limit the water reuse applications within a refinery or another industry. While both chemical additives are effective sources of the ferric ion, the choice between the two may depend on economic factors and water reuse considerations.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

A jar was filled with 1 liter of phenolic stripped sour water containing 4.76 parts per million (w/v) of selenium. The water was treated with a 1% dose of ferric chloride, with stirring, followed by a 1% dose of potassium permanganate. After several minutes of stirring the precipitate settled and the supernatant liquid was recovered containing 2.60 part per million selenium. These results represent a selenium removal of 45.4%.

EXAMPLE 2

A jar was filled with 1 liter of phenolic stripped sour water containing 4.34 parts per million (w/v) of selenium. The water was treated with a 1.50% dose of ferric chloride, with stirring, followed by a 1.75% dose of potassium permanganate. After several minutes of stirring the precipitate settled. The supernatant liquid was recovered containing 0.273 ppm selenium. These results represent a selenium removal of 93.7%.

EXAMPLE 3

During a continuous flow pilot test, 20 gallons per minute of phenolic stripped sour water, containing 4.37 mg selenium per liter, and 3.2 gallons per minute of 36% ferric sulfate solution were fed to a 950-gallon stirred-tank reactor. The reactor was maintained at a temperature of 90° F. The effluent from the reactor was fed to a 950-gallon stirred-tank reactor, together with 13.6 gallons per minute of 5% potassium permanganate solution. This second reactor was maintained at a temperature of 90° F. The effluent from the second reactor was allowed to settle in a portable tank and the supernatant liquid had a selenium content of 0.32 to 0.75 milligrams selenium per liter, representing a selenium removal range of 82.8 to 93.1%.

EXAMPLE 4

During a continuous flow pilot test, 0.15 gallons per minute of reverse osmosis reject water, from a reverse osmosis treatment of phenolic stripped sour water, containing between 21 and 26.9 mg selenium/liter, and 0.13 gallons per hour of 36% ferric sulfate solution were fed to a 12-gallon stirred-tank reactor. The reactor was maintained at a temperature of 75° F. The effluent from the reactor was fed to a 20-gallon stirred-tank reactor, together with 0.44 to 1.02 gallons per hour of 5% potassium permanganate solution. This second reactor was maintained at a temperature of 75° F. The effluent from the second reactor had a selenium content of 0.17 to 1.02 milligrams selenium per liter, representing a selenium removal range of 95.1 to 99.4%.

EXAMPLE 5

During a continuous flow pilot test, 30 gallons per minute of phenolic stripped sour water, containing 4.5 to 5.5 mg selenium per liter, were fed and treated in the same manner as described by Example 4. The effluent from the second reactor was directed to a centrifuge to remove the precipitate. The centrate (clarified effluent had an average selenium concentration of 0.5 mg per liter, representing a selenium removal range of 88.9 to 90.9%.

While the compositions and methods of this invention have been described in terms of preferred embodiments, it will be apparent to those of skill in the art that variations may be applied to the process described herein without departing from the concept, spirit and scope of the invention. All such similar substitutions and modifications apparent to those skilled in the art are deemed to be within the spirit, scope and concept of the invention as setforth in the following claims.

What is claimed is:

1. A continuous process for removing selenium from a selenium containing waste water stream, comprising:
    adjusting the temperature of the selenium containing stream to between about 80–90° F. in a continuous-flow heat exchanger;
    adding to the waste water, by automatic metered addition, an aqueous ferric salt containing solution to form a first stream containing ferric hydroxide and ferric oxyhydroxide;
    adding to the first stream, by automatic metered addition, an aqueous permanganate salt containing solution in a sufficient amount to oxidize the selenium to selenite ion and manganese dioxide containing solids to form a second stream including selenium containing solids;
    separating the selenium containing solids from the second stream by centrifugation, leaving a centrifuged liquid stream; and
    adding to the centrifuged liquid stream, by automatic metered addition, an aqueous base containing solution to increase the pH of the liquid stream to approximately 6.0 to 8.0.

2. The process of claim 1 wherein the ferric salt is selected from ferric sulfate, ferric nitrate, and ferric chloride.

3. The process of claim 2 wherein the ferric salt is ferric sulfate.

4. The process of claim 1 wherein the permanganate salt is potassium permanganate.

5. A continuous process for removing selenium from a selenium containing aqueous stream, wherein the selenium containing stream is mixed first with a ferric salt containing solution to form a first mixture containing ferric hydroxide and ferric oxyhydroxide precipitates, and the first mixture is mixed with a permanganate salt containing solution to form a second mixture containing manganese dioxide precipitates including selenium containing solids, the improvement comprising:
    adjusting the temperature of the selenium containing aqueous stream to between about 80–90° F. in a continuous-flow heat exchanger prior to mixing it with the ferric salt containing solution;
    separating the solids from the second mixture by centrifugation, leaving a centrifuged liquid stream; and
    adjusting the pH of the centrifuged liquid stream to between approximately 6.0 and approximately 8.0 by adding to the centrifuged mixture, by automatic metered addition, an aqueous base containing solution.

6. The process of claim 5 wherein the ferric salt is selected from ferric sulfate, ferric nitrate, and ferric chloride.

7. The process of claim 6 wherein the ferric salt is ferric sulfate.

8. The process of claim 5 wherein the permanganate salt is postassium permanganate.

* * * * *